US006781566B2

(12) United States Patent
Zuravleff

(10) Patent No.: US 6,781,566 B2
(45) Date of Patent: Aug. 24, 2004

(54) RESIDUAL DC BIAS CORRECTION IN A VIDEO IMAGING DEVICE

(75) Inventor: William K. Zuravleff, Mountain View, CA (US)

(73) Assignee: Aurora Systems, Inc., San Jose, CA (US)

( * ) Notice: Subject to any disclaimer, the term of this patent is extended or adjusted under 35 U.S.C. 154(b) by 277 days.

(21) Appl. No.: 09/935,535

(22) Filed: Aug. 22, 2001

(65) Prior Publication Data

US 2003/0038763 A1 Feb. 27, 2003

(51) Int. Cl.[7] ................................................. G09G 3/36
(52) U.S. Cl. .......................... 345/87; 345/204; 349/113
(58) Field of Search .......................... 345/87–104, 204; 349/113–116

(56) References Cited

U.S. PATENT DOCUMENTS

| | | | | |
|---|---|---|---|---|
| 4,012,119 A | * | 3/1977 | Adams et al. ................. 349/30 |
| 4,185,894 A | * | 1/1980 | Hilton et al. ................ 349/114 |
| 4,432,610 A | * | 2/1984 | Kobayashi et al. .......... 350/331 |
| 5,020,881 A | * | 6/1991 | Matsuda et al. ............. 350/333 |
| 5,200,845 A | * | 4/1993 | Crooker et al. ................ 359/51 |
| 5,309,262 A | * | 5/1994 | Haas ............................ 349/29 |
| 5,801,796 A | * | 9/1998 | Lowe ........................... 349/73 |
| 6,392,725 B1 | * | 5/2002 | Harada et al. ................. 349/74 |

\* cited by examiner

Primary Examiner—Lun-Yi Lao
(74) Attorney, Agent, or Firm—Henneman & Saunders; Larry E. Henneman, Jr.

(57) ABSTRACT

A reflective LCD array (10) having a plurality of mirrors (40) in a mirror layer (14) of material layers (12). Underlying the mirror layer (12) are at least a second metal layer (18) and a third metal layer (20). The second metal layer (18) and the third metal layer (20) will each have a first plurality of power traces (50) and (51), arrayed such that the power traces (50) and (51) generally completely underlie a plurality of gaps (44, 46) between the mirrors (40). The power traces (50) are positioned such that the average voltage presented thereby is $\frac{1}{2}(V0+V1)$. This will generally prevent the buildup of a residual DC bias between the mirrors (40) and an ITO layer (32) which might otherwise cause the production of ions (38) which could degrade the performance of and perhaps damage the reflective LCD array (10).

22 Claims, 4 Drawing Sheets

RESIDUAL DC BIAS CORRECTION IN A VIDEO IMAGING DEVICE

TECHNICAL FIELD

The present invention relates to the field of integrated display device manufacture, and more specifically to an improved method and construction for the manufacture of light reflective liquid crystal display ("LCD") arrays. The predominant current usage of the present inventive improved DC bias apparatus and method is in the construction of light reflective LCD arrays for projection display devices, wherein picture quality is of great importance, due to the fact that an image produced thereby will be greatly enlarged.

BACKGROUND ART

It is known in the art that any long term DC voltage bias in the liquid crystal of an LCD array will eventually destroy its operation. Although great effort in the design of the mirror cell and the algorithms of data presentation go into eliminating this bias, no solution has yet been found that completely eliminates the DC voltage bias.

Prior art algorithms for eliminating DC bias typically involve periodically switching the voltage on the ITO electrode between two or more voltages. For example, in one implementation of liquid crystal cell operation, the ITO has a voltage V0. An "on" mirror has a voltage of V1 asserted thereon, while an "off" mirror has a voltage V0 asserted thereon. Periodically (e.g., once per frame of data), the voltage on the ITO is switched between V0 and V1, as are the "on" and "off" voltages. This type of routine eliminates some, but not all, of the DC bias observed in LCD arrays.

It would be desirable to have some method or means to more completely eliminate the residual DC voltage buildup from such LCD arrays. However, to the inventor's knowledge, no such method or means has existed in the prior art.

SUMMARY

Accordingly, it is an object of the present invention to provide a method and apparatus for assisting in preventing the buildup of a residual DC bias in a liquid crystal display array.

It is another object of the present invention to prolong the life and improve the performance of a reflective LCD array.

It is still another object of the present invention to provide a method and apparatus for preventing the buildup of a residual DC voltage between an ITO layer of an LCD array and metal underlying the mirrors thereof.

It is yet another object of the present invention to provide a method and apparatus to prevent the migration of ions within an LCD array.

While prior art solutions have generally assumed that all electric field lines originating on the indium tin oxide ("ITO") layer above the liquid crystal, which go through the liquid crystal, terminate on the mirrors, the inventor has found that a small portion of electric field lines pass through the gap in the mirrors and terminate on the metal layers beneath them. If that metal has a voltage bias with respect to the ITO, then there is a residual DC bias in the liquid crystal.

Briefly, the present invention provides traces within the spaces between the mirrors of a reflective LCD array which, on average over a limited area, carry voltages which tend to prevent the migration of ions within the liquid crystal. As stated above, in one implementation of liquid crystal cell operation, the ITO is periodically switched to eliminate DC voltage bias in the liquid crystal which might be built up between the mirrors and the ITO. However, this procedure does not eliminate bias which might be built up by differential voltages occurring between the ITO and circuitry underlying the gaps between the mirrors.

Because the ITO is switched between V0 and V1, the average voltage on the ITO over time is ½ (V0+V1). If we "plug the gaps" in the mirrors with metal which is statically held at ½ (V0+V1), the residual bias is eliminated. However, such a voltage does not typically exist within the LCD array. Therefore, according to the present invention, the gaps between the mirrors are plugged with equal areas of traces carrying V0 and V1. Therefore, the residual bias (averaged over an area which includes equal areas of V0 and V1) will be zero, thereby essentially eliminating this potential source of residual DC bias.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and advantages. Accordingly, the listed advantages are not essential elements of the present invention, and should not be construed as limitations.

DETAILED DESCRIPTION

Figure 1:
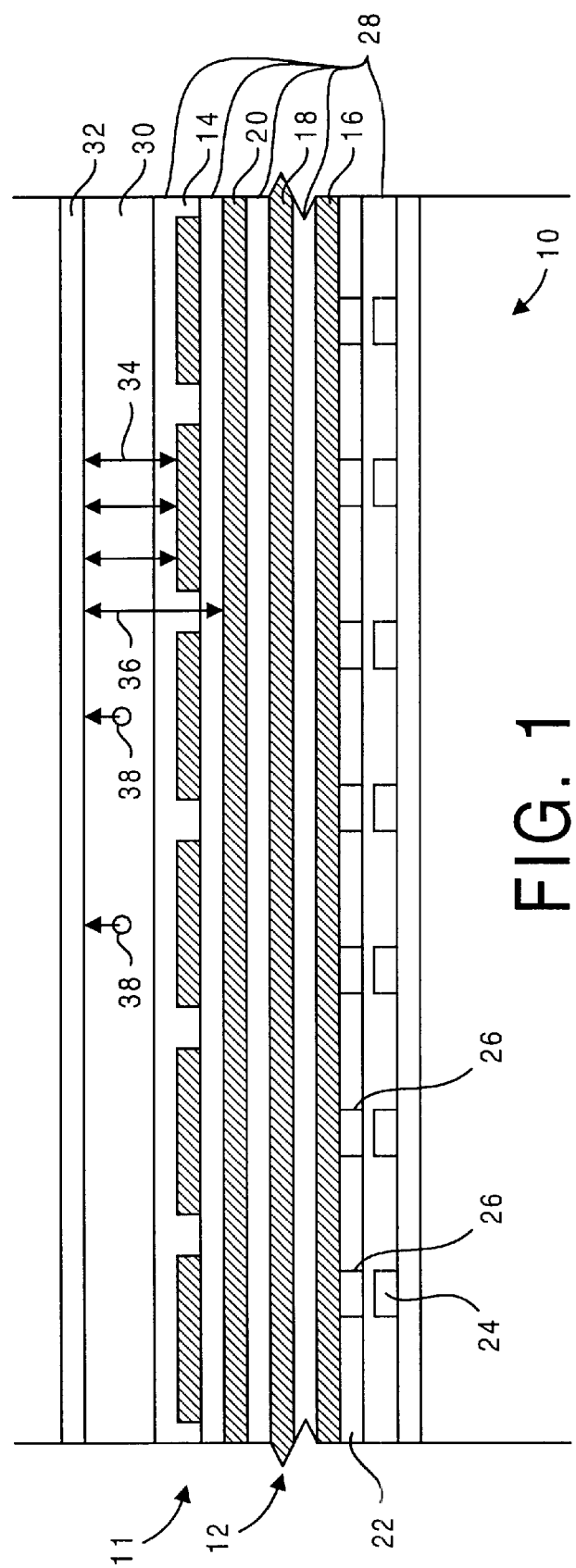
FIG. 1 is a cross-sectional, side elevational view of a portion of an example of a reflective LCD array, according to the present invention.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

A known mode for carrying out the invention is a unique reflective LCD array. A portion of the inventive reflective LCD array is depicted in a diagrammatic (not to scale) side elevational view in FIG. 1 and is designated therein by the general reference character 10. The reflective LCD array 10 has an integrated circuit ("IC") portion 11 which, not unlike conventional prior art devices, has a plurality of material layers 12. The embodiment discussed by way of example herein has a mirror layer 14, a first metal (M1) layer 16, a second metal (M2) layer 18, and a third metal (M3) layer 20. In the present example also are a polysilicon (recrystallized silicon) layer 22 and a diffusion layer 24. One skilled in the art will recognize that the areas where traces on the poly layer 22 mask those of the diffusion layer 24 are semiconductor junctions 26. Also visible in the view of FIG. 1 are a plurality of silicon dioxide insulating layers 28.

After the IC portion 11 is created, a liquid crystal layer 30 and an ITO layer 32 are added thereto. One skilled in the art will recognize that the ITO layer 32 and the mirror layer 14 provide the electrical poles for polarizing the liquid crystal layer 30 therebetween. As previously discussed, herein, it is known in the art to periodically switch the voltages applied to the ITO layer 32 and the mirror layer 14. This is done in an attempt to eliminate DC buildup in the liquid crystal which could result in residual images and, perhaps, eventually in damage to the liquid crystal 30. As discussed briefly previously herein, alternating the voltages on the ITO layer 32 and the mirror layer 14 will tend to prevent residual DC bias in the areas indicated by the arrows 34. However, in the relatively small areas, such as the example indicated by the arrow 36, there will be electric field lines between the metal layers 16, 18 and/or 20 and the ITO layer 32 which might result in a DC bias and the eventual migration of ions 38 in the liquid crystal layer 30.

One skilled in the art will recognize that a lesser or greater quantity of layers might be used to construct such an array. The example of FIG. 1 is intended only to further the understanding of the present invention. Also, one skilled in the art will recognize that the example of FIG. 1 is not an exhaustive list of all of the components of such an array. Additional features such as a substrate on which the material layers 12 are built, a case, external electrical connectors, and the like are omitted from the view of FIG. 1 as being unnecessary to an understanding of the invention.

Figure 2:
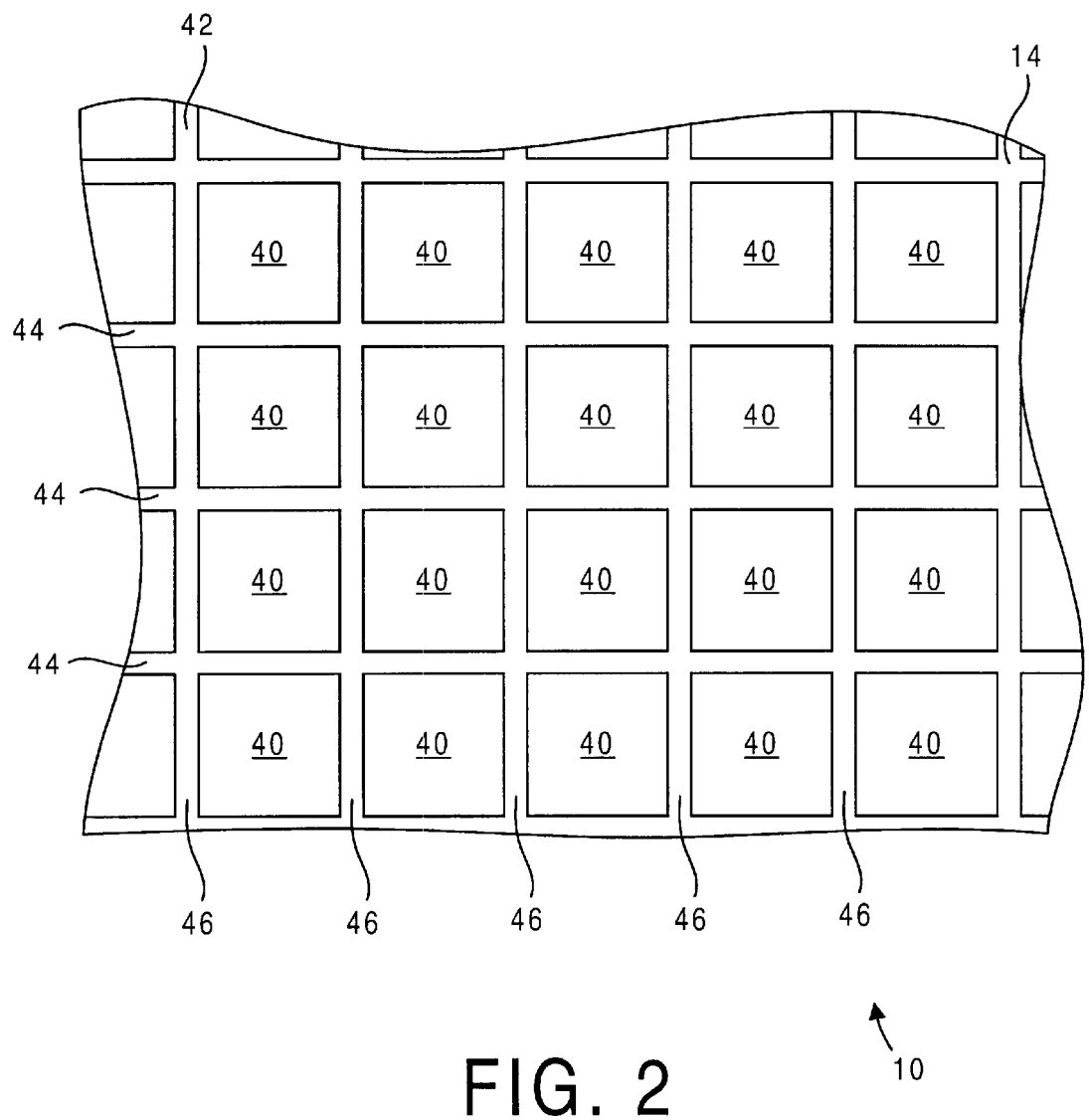
FIG. 2 is a diagrammatic top plan view of a portion of the reflective LCD array of FIG. 1, showing the layout of the mirrors thereof.

FIG. 2 is a diagrammatic top plan view of a portion of the reflective LCD 10 array of FIG. 1, showing the layout of a plurality of mirrors 40 thereon. The mirrors 40 are in the mirror layer 14 (FIG. 1), previously discussed herein in relation to FIG. 1, and can be viewed through the protective insulating layer 28, the liquid crystal layer 30 and the ITO layer 32 which are over the mirror layer 14. In the view of FIG. 2 it can be seen that there are gaps 42 between the mirrors 40 where through which electric field lines might flow through the liquid crystal layer 30 between the circuitry on the third metal (M3) layer 20 (FIG. 1) and ITO layer 32 (FIG. 1), thereby causing ions 38 to migrate through the liquid crystal layer 30. Since, in this present example, the generally square mirrors 40 are arrayed in rows and columns, the gaps 42 may be referred to has horizontal gaps 44 and vertical gaps 46, when viewed from the perspective of FIG. 2.

Figure 3:
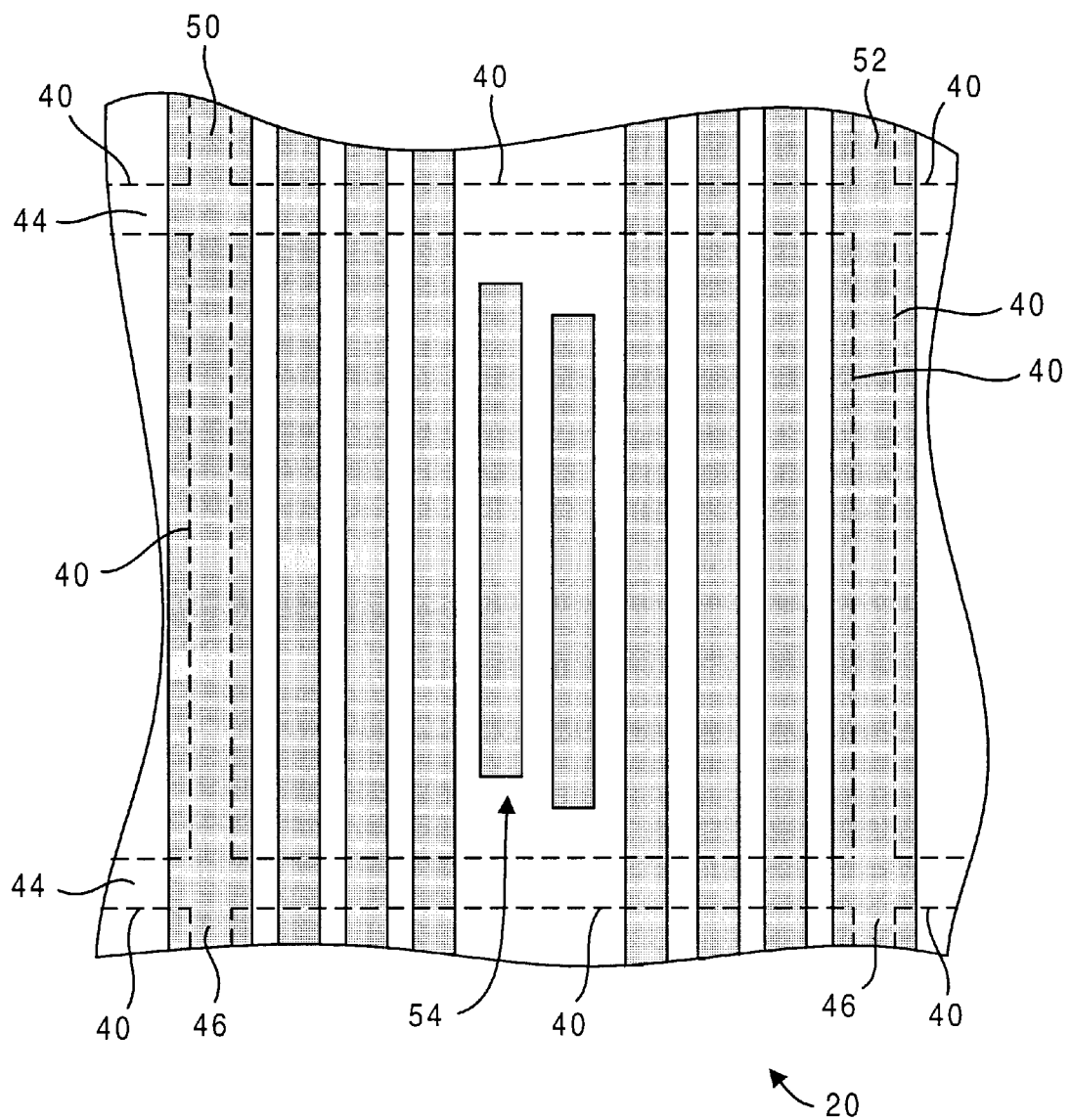
FIG. 3 is a layout diagram of a third metal (M3) layer of the present example of the reflective LCD array 10 of FIGS. 1 and 2.

FIG. 3 is a layout diagram of a portion of the third metal (M3) layer 20 of the present example of the reflective LCD array 10. In this diagram, dotted lines are superimposed thereon to represent the boundaries of the mirrors 40 which overlie the third metal (M3) layer 20. As can be seen in the view of FIG. 3, the circuitry shown is primarily that underlying one of the mirrors 40, and extended to show that underlying a small portion of the mirrors 40 adjacent thereto. One skilled in the art of integrated circuit layout will be familiar with the diagram of FIG. 3 which is conventional in many respects. A unique aspect visible in the diagram of FIG. 3 is that a V0 power trace 50 and a V1 power trace 52 border the circuitry shown on the left and right, respectively, as seen from the perspective of FIG. 3. The V0 power trace 50 and the V1 power trace 52 are primary power "buss" traces on the third metal (M3) layer 20 in this present example. One skilled in the art will recognize that the circuitry under the mirrors 40 (FIG. 2) is mirrored under adjacent examples of the mirrors 40 such that alternate examples will be the mirror image of an example immediately adjacent thereto. According to the present example, the V0 and V1 traces 50, 52 are not repeated in such mirror images, but rather are shared by adjacent examples. This is illustrated in the view of FIG. 3 by the fact that a portion of two of the adjacent mirrors 40 are visible in the view of FIG. 3. As can be seen in the view of FIG. 3, the V0 and V1 traces 50, 52 more than fill the vertical gaps 46 between the mirrors 40. As can be appreciated in light of the above, since alternate examples of the pattern depicted in the view of FIG. 3 are mirrored, then every other one of the vertical gaps 46 will be alternately "plugged" by either one of the V0 power trace 50 or the V1 power trace 52, respectively. Additional circuitry 54 visible in the view of FIG. 3 is generally conventional in nature and will not be further discussed herein.

Figure 4:
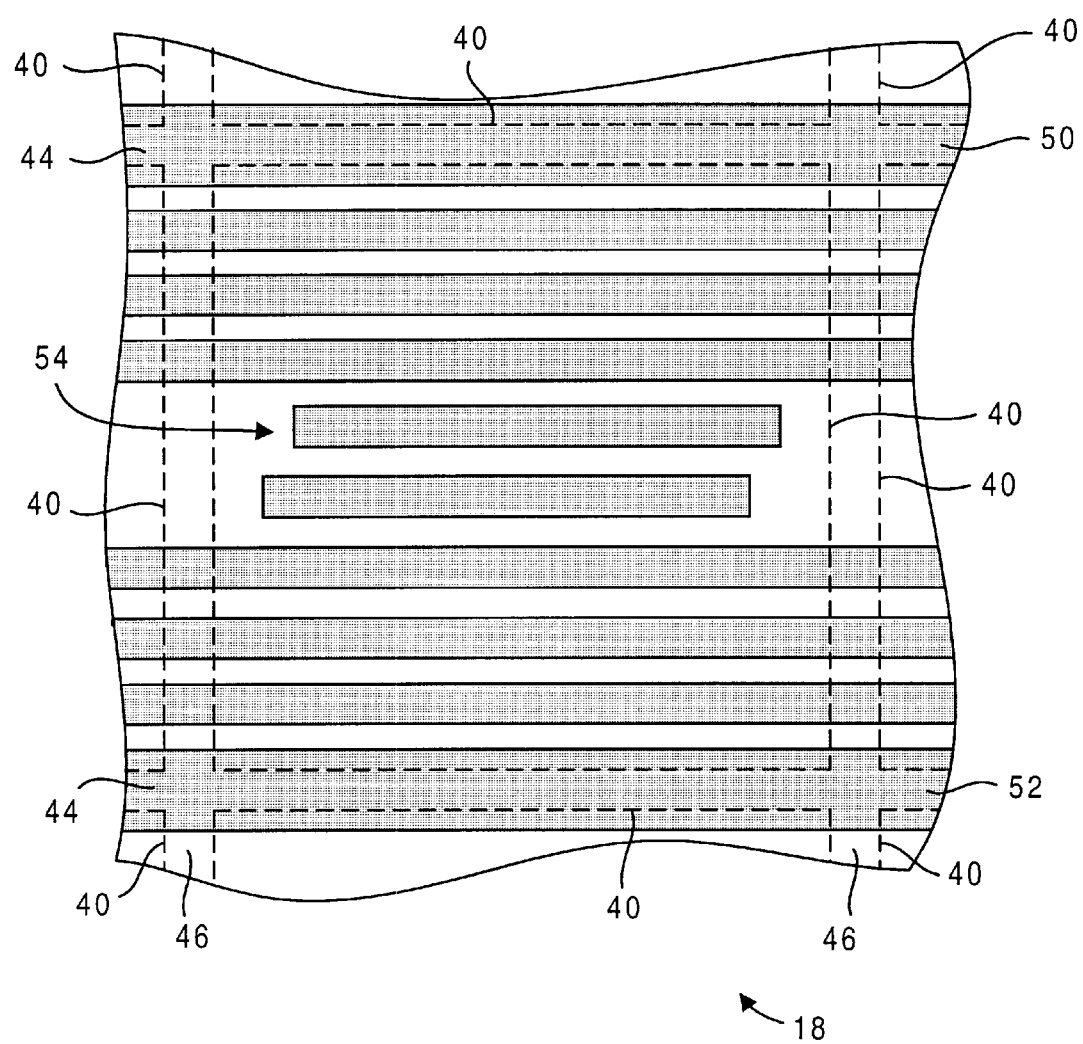
FIG. 4 is a layout diagram of a second metal (M2) layer of the present example of the reflective LCD array of FIGS. 1 and 2.

FIG. 4 is a layout diagram of a portion of the second metal (M2) layer 18 of the present example of the reflective LCD array 10. As in the view of FIG. 3, in this diagram, dotted lines are superimposed thereon to represent the boundaries of the mirrors 40 which overlie the second metal (M2) layer 18. Visible in the diagram of FIG. 4 are additional incidences of the V0 power trace 50 and the V1 power trace 52 bordering the circuitry underlying pixel mirror 40 on the top and bottom, respectively, as seen from the perspective of FIG. 4. The circuitry of FIG. 4, which is also under the mirrors 40 (FIG. 2) as can be seen in FIG. 1, is also mirrored under adjacent examples of the mirrors 40 vertically (as viewed from the perspective of FIG. 4) such that alternate examples will be the mirror image of an example immediately adjacent thereto. As with the example of the third metal (M3) layer 20 discussed previously herein in relation to FIG. 3, according to the present example, the V0 and V1 traces 50, 52 are not repeated in such mirror images, but rather are shared by adjacent examples. This is illustrated in the view of FIG. 4 by the fact that a portion of two of the adjacent mirrors 40 are visible in the view of FIG. 4. As can be appreciated in light of the above, since alternate examples of the pattern depicted in the view of FIG. 4 are mirrored, then every other one of the horizontal gaps 44 will be alternately "plugged" by one of either the V0 power trace 50 or the V1 power trace 52, respectively.

As can be seen in the view of FIG. 4, the V0 and V1 traces 50, 52 more than fill the horizontal gaps 44 between the mirrors 40. It should also be noted that, since the second metal (M2) layer 18 lies under the third metal (M3) layer 20, then only those portions of the horizontal gaps 44 which are not already filled by the power traces 50 and 52 of the third metal (M3) layer 20 will be exposed to the power traces 50 and 52 of the second metal (M2) layer 18. In any event, it can be appreciated in light of the above that generally half of the total area of the gaps 42 (FIG. 2) will be filled by the V0 power traces 50, while the other half will be filled by the V1 power traces 52. Further, according to the arrangement described above, the V0 power traces 50 and the V1 power traces 52 will be alternately arranged such that over any area slightly larger than one of the mirrors 40 (FIG. 2), the average voltage presented in the gaps 42 will be ½ (V0+V1). As discussed above, this is the voltage required to essentially eliminate residual DC bias between the metal layers 16, 18 and 20 and the ITO layer 32.

Various modifications may be made to the invention without altering its value or scope. For example, while, in the example described in detail herein, the gaps 42 between the mirrors 40 are plugged by V0 power traces 50 and V1 power traces 52 which are used to power the additional circuitry 54, it is within the scope of the invention to provide V0 and V1 power traces 50, 51 which serve no other purpose than to prevent the unwanted DC bias discussed herein. Such dedicated power traces (not shown) could be part of an existing metal layer or layers, or could be on a separate layer provided for shielding of voltages, light, or the like.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

Industrial Applicability

The inventive reflective LCD array 10 is intended to be widely used in the production of video imaging devices. According to the present invention, the migration of ions 38 in the liquid crystal 30 will be reduced, thereby improving the performance and enhancing the life of the reflective LCD array 10 device. Prior art methods exist for reducing or preventing residual DC bias between the mirrors 40 and the ITO layer 32. However, the inventor has found that DC bias created between the ITO layer and the underlying metal layers 16, 18 and 20, while relatively small, is not insignificant. Therefore, it is believed that the present inventive method and apparatus will provide a significant improvement in the art.

Since the reflective LCD arrays 10 of the present invention may be readily produced using known manufacturing methods and operations, and since the advantages as described herein are provided, it is expected that it will be readily accepted in the industry. For these and other reasons, it is expected that the utility and industrial applicability of the invention will be both significant in scope and long-lasting in duration.

What is claimed is:

1. In an LCD imaging device having a liquid crystal layer between a top conductive layer and a lower imaging surface layer, wherein said imaging surface layer has a plurality of generally coplanar individual imaging surfaces separated by spaces therebetween, an improvement comprising:

at least one metal layer including a plurality of voltage traces located generally below the spaces and defining gaps between the traces below said imaging surfaces; wherein said voltage traces carry an average voltage which is generally the same as the average voltage over time of the top conductive layer.

2. The improvement of claim 1, wherein:

the top conductive layer is an indium tin oxide conductive layer.

3. The improvement of claim 1, wherein:

the individual imaging surfaces are mirror surfaces.

4. The improvement of claim 1, wherein:

said voltage traces are at least as wide as the spaces.

5. The improvement of claim 1, wherein:

said voltage traces generally completely fill the spaces.

6. The improvement of claim 1, wherein:

alternate members of the voltage traces carry a first voltage; and remaining members of the voltage traces carry a second voltage.

7. The improvement of claim 6, wherein:

the average of all of the voltage traces over the area of the imaging device is ½ the sum of the first voltage and the second voltage.

8. The improvement of claim 1, wherein:

said voltage traces are power traces on a metal layer of the LCD imaging device.

9. The improvement of claim 1, wherein:

said voltage traces are functional power traces for providing power to at least a part of the LCD imaging device.

10. The improvement of claim 1, wherein:

at least some of the voltage traces are connected together.

11. A method for reducing residual DC bias in an LCD imaging device, comprising:

providing at least one metal layer including a plurality of power traces disposed under gaps between adjacent pixel elements and defining spaces between said traces under said pixel elements;

providing an average voltage to said power traces which is generally equal to the voltage present over time on an opposing conductive layer.

12. The method of claim 11, wherein:

the gaps are spaces between a plurality of mirrors in a mirror layer.

13. The method of claim 11, wherein:

at least some of said power traces carry a first voltage; and at least some of said power traces carry a second voltage.

14. The method of claim 11, wherein:

said power traces generally completely underlie the gaps.

15. The method of claim 11, wherein:

at least some of the power traces are connected together.

16. A liquid crystal display device, comprising:

a liquid crystal layer;

a conductive layer above the liquid crystal layer;

a plurality of conductive mirrors beneath the liquid crystal layer;

a plurality of gaps between the mirrors; and at least one metal layer including a plurality of metal traces beneath the gaps and defining spaces between the traces under the mirrors; wherein said metal traces, on average, carry a voltage which is equal to the average voltage over time on the conductive layer.

17. The liquid crystal display device of claim 16, wherein:

said conductive layer switches between a first voltage and a second voltage;

generally one half of said metal traces carry the first voltage; and generally one half of said metal traces carry the second voltage.

18. The liquid crystal display device of claim 17, wherein:

alternate iterations of the metal traces carry the first voltage.

19. The liquid crystal display device of claim 16, wherein:

generally one half of said metal traces are located on a first metal layer; and generally one half of said metal traces are located on a second metal layer.

20. The liquid crystal display device of claim 16, wherein:

said metal traces are power traces for providing power to the liquid crystal display.

21. The liquid crystal display device of claim 16, wherein:

alternate iterations of the metal traces carry a first voltage; and alternate iterations of the metal traces carry a second voltage.

22. The liquid crystal display device of claim 16, wherein at least some of the metal traces are connected together.

* * * * *